United States Patent
Davanco (10) Patent No.: US 11,451,306 B2
(45) Date of Patent: Sep. 20, 2022

(54) SINGLE QUANTUM EMITTER SINGLE PHOTON SOURCE AND PRODUCING A SINGLE PHOTON STREAM

(71) Applicant: Government of the United States of America, as represented by the Secretary of Commerce, Gaithersburg, MD (US)

(72) Inventor: Marcelo Ishihara Davanco, Rockville, MD (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 302 days.

(21) Appl. No.: 16/875,201

(22) Filed: May 15, 2020

(65) Prior Publication Data

US 2020/0396006 A1    Dec. 17, 2020

Related U.S. Application Data

(60) Provisional application No. 62/861,343, filed on Jun. 14, 2019.

(51) Int. Cl.
*H04B 10/00*    (2013.01)
*H04B 10/70*    (2013.01)
(Continued)

(52) U.S. Cl.
CPC ......... *H04B 10/70* (2013.01); *G02B 6/29337* (2013.01)

(58) Field of Classification Search
CPC ...................................................... H04B 10/70
See application file for complete search history.

(56) References Cited

U.S. PATENT DOCUMENTS

| 8,842,949 B2 | 9/2014 | Schroder et al. | |
| 10,074,771 B2* | 9/2018 | Hardtdegen | H04L 9/0852 |
| 2020/0209656 A1* | 7/2020 | Young | H04L 9/0852 |

OTHER PUBLICATIONS

Davanco, M., et al., "Heterogeneous integration for on-chip quantum photonic circuits with single quantum dot devices", Nature Communications, 2017, p. 1-12, DOI: 10.1038/s41467-017-00987-6.

(Continued)

*Primary Examiner* — Daniel G Dobson
(74) *Attorney, Agent, or Firm* — Office of Chief Counsel for National Institute of Standards and Technology (57) ABSTRACT

A single quantum emitter single photon source produces a single photon stream and includes: a single-mode excitation waveguide that receives a pump light, propagates pump light as resonant excitation light, and produces evanescent excitation light; a separation gap between single-mode excitation waveguide and a multi-mode intermediate waveguide; a multi-mode intermediate waveguide that: includes a single quantum emitter, evanescently receives the evanescent excitation light from the single-mode excitation waveguide, propagates the evanescent excitation light as resonant excitation light, and subjects the single quantum emitter to the resonant excitation light such that the single quantum emitter produces emitted single photons; and a single-mode output waveguide that receives the emitted single photons from the multi-mode intermediate waveguide and propagates the emitted single photons as an emitted single photon stream.

18 Claims, 3 Drawing Sheets

(51) Int. Cl.
G02B 6/293 (2006.01)
H04J 14/00 (2006.01)

(56) References Cited

OTHER PUBLICATIONS

Davanco, M., et al., "Efficient quantum dot single photon extraction into an optical fiber using a nanophotonic directional coupler", Applied Physics Letters, 2011, p. 121101, vol. 99.

Davanco, M., et al., "Fiber-coupled semiconductor waveguides as an efficient optical interface to a single quantum dipole", Optics Letter, 2009, p. 2542-2544, vol. 34 Vo.16.

Davanco, M., et al., "Efficient spectroscopy of single embedded emitters using optical fiber taper waveguides" Optics Letters, 2009, p. 10542-10563, vol. 17 No. 13.

Uppu, R., et al., "On-chip deterministic operation of quantum dots in dual-mode waveguides for a plug-and-play dingle-photon source", 2020, DOI: arXiv:2001.10716.

\* cited by examiner

SINGLE QUANTUM EMITTER SINGLE PHOTON SOURCE AND PRODUCING A SINGLE PHOTON STREAM

CROSS REFERENCE TO RELATED APPLICATIONS

The application claims priority to U.S. Provisional Patent Application Ser. No. 62/861,343 filed Jun. 14, 2019, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 975-2573; email tpo@nist.gov.

BRIEF DESCRIPTION

Disclosed is a single quantum emitter single photon source for producing a single photon stream, the single quantum emitter single photon source comprising: a single-mode excitation waveguide that receives a pump light, propagates pump light as resonant excitation light, and produces evanescent excitation light from resonant excitation light; a first separation gap that separates the single-mode excitation waveguide and a multi-mode intermediate waveguide and that receives the evanescent excitation light from the single-mode excitation waveguide; the multi-mode intermediate waveguide in evanescent communication with the single-mode excitation waveguide and that: comprises a single quantum emitter disposed in the multi-mode intermediate waveguide, evanescently receives the evanescent excitation light from the single-mode excitation waveguide across the first separation gap, propagates the evanescent excitation light as resonant excitation light, and subjects the single quantum emitter to the resonant excitation light such that the single quantum emitter produces emitted single photons from the resonant excitation light; a second separation gap that separates the multi-mode intermediate waveguide and a single-mode output waveguide and that receives the emitted single photons from the multi-mode intermediate waveguide; and the single-mode output waveguide in evanescent communication with the multi-mode intermediate waveguide and that: evanescently receives the emitted single photons from the multi-mode intermediate waveguide across the second separation gap, and propagates the emitted single photons as emitted single photon stream.

Disclosed is a single quantum emitter single photon source for producing a single photon stream, the single quantum emitter single photon source comprising: a single-mode excitation waveguide that receives a pump light, propagates pump light as resonant excitation light, and produces evanescent excitation light from resonant excitation light; a separation gap that separates the single-mode excitation waveguide and a multi-mode intermediate waveguide and that receives the evanescent excitation light from the single-mode excitation waveguide; the multi-mode intermediate waveguide in evanescent communication with the single-mode excitation waveguide and that: comprises a single quantum emitter disposed in the multi-mode intermediate waveguide, evanescently receives the evanescent excitation light from the single-mode excitation waveguide across the separation gap, propagates the evanescent excitation light as resonant excitation light, and subjects the single quantum emitter to the resonant excitation light such that the single quantum emitter produces emitted single photons from the resonant excitation light; an adiabatic mode transformer that separates the multi-mode intermediate waveguide and a single-mode output waveguide and that: is in optical communication with the multi-mode intermediate waveguide, receives the emitted single photons from the multi-mode intermediate waveguide, and optically couples the multi-mode intermediate waveguide and the single-mode output waveguide, and eliminates the resonant excitation light, preventing it from entering the single-mode output waveguide; and the single-mode output waveguide in optical communication with the adiabatic mode transformer and that: receives the emitted single photons from the adiabatic mode transformer, and propagates the emitted single photons as emitted single photon stream.

Disclosed is a process for producing a single photon stream with a single quantum emitter single photon source, the process comprising: producing a pump light; receiving, by a single-mode excitation waveguide, the pump light; propagating the pump light as resonant excitation light in the single-mode excitation waveguide; producing evanescent excitation light from the resonant excitation light; receiving the evanescent excitation light in a separation gap that separates the single-mode excitation waveguide from a multi-mode intermediate waveguide; propagating the evanescent excitation light through the separation gap; evanescently receiving, by the multi-mode intermediate waveguide, the evanescent excitation light from the single-mode excitation waveguide through the separation gap; propagating the evanescent excitation light as resonant excitation light through the multi-mode intermediate waveguide; subjecting a single quantum emitter disposed in the multi-mode intermediate waveguide to the resonant excitation light; producing, by the single quantum emitter, emitted single photons from the resonant excitation light; propagating the emitted single photons through the multi-mode intermediate waveguide; communicating the emitted single photons from the multi-mode intermediate waveguide to a single-mode output waveguide; receiving, by the single-mode output waveguide, the emitted single photons from the multi-mode intermediate waveguide; and propagating, through the single-mode output waveguide, the emitted single photons at emitted single photon stream to produce the emitted single photon stream.

BRIEF DESCRIPTION OF THE DRAWINGS

The following description should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a single quantum emitter single photon source herein provides an integrated photonic device that produces pure, waveguide-bound single photon streams via resonance fluorescence from a single quantum emitter from optical excitation through on-chip waveguide-bound resonant laser light.

A single quantum emitter can be a light source that produces single photons in an on-chip waveguide for integrated quantum photonic articles and processes. Illumination with laser light resonant of a single quantum emitter disposed in a waveguide produces indistinguishable waveguide-bound single photons. Leakage of light from the excitation laser into the waveguide must be suppressed. Conventionally, illumination with a free-space laser beam that propagates perpendicular to a length of the waveguide has limited efficacy and limited controllability. The single quantum emitter single photon source overcomes these issues through illumination of the single quantum emitter with a high-order confined mode of the waveguide that is evanescently coupled another waveguide that introduces excitation photons to the single quantum emitter from which is extracted a single-photon stream via a third waveguide.

It has been discovered that single quantum emitter single photon source 200 produces emitted single photon stream 210. In an embodiment, with reference to FIG. 1, single quantum emitter single photon source 200 including: single-mode excitation waveguide 201 that receives pump light 202, propagates pump light 202 as resonant excitation light 204, and produces evanescent excitation light 203 from resonant excitation light 204; first separation gap 213.1 that separates single-mode excitation waveguide 201 and multi-mode intermediate waveguide 205 and that receives evanescent excitation light 203 from single-mode excitation waveguide 201; multi-mode intermediate waveguide 205 in evanescent communication with single-mode excitation waveguide 201 and that: comprises single quantum emitter 207 disposed in multi-mode intermediate waveguide 205, evanescently receives evanescent excitation light 203 from single-mode excitation waveguide 201 across first separation gap 213.1, propagates evanescent excitation light 203 as high-order mode resonant excitation light 206, and subjects single quantum emitter 207 to resonant excitation light 206 such that single quantum emitter 207 produces first order mode emitted single photons 208 from high-order mode resonant excitation light 206; second separation gap 213.2 that separates multi-mode intermediate waveguide 205 and single-mode output waveguide 209 and that receives emitted single photons 208 from multi-mode intermediate waveguide 205; and single-mode output waveguide 209 in evanescent communication with multi-mode intermediate waveguide 205 and that: evanescently receives emitted single photons 208 from multi-mode intermediate waveguide 205 across second separation gap 213.2, and propagates emitted single photons 208 as emitted single photon stream 210.

Figure 2:
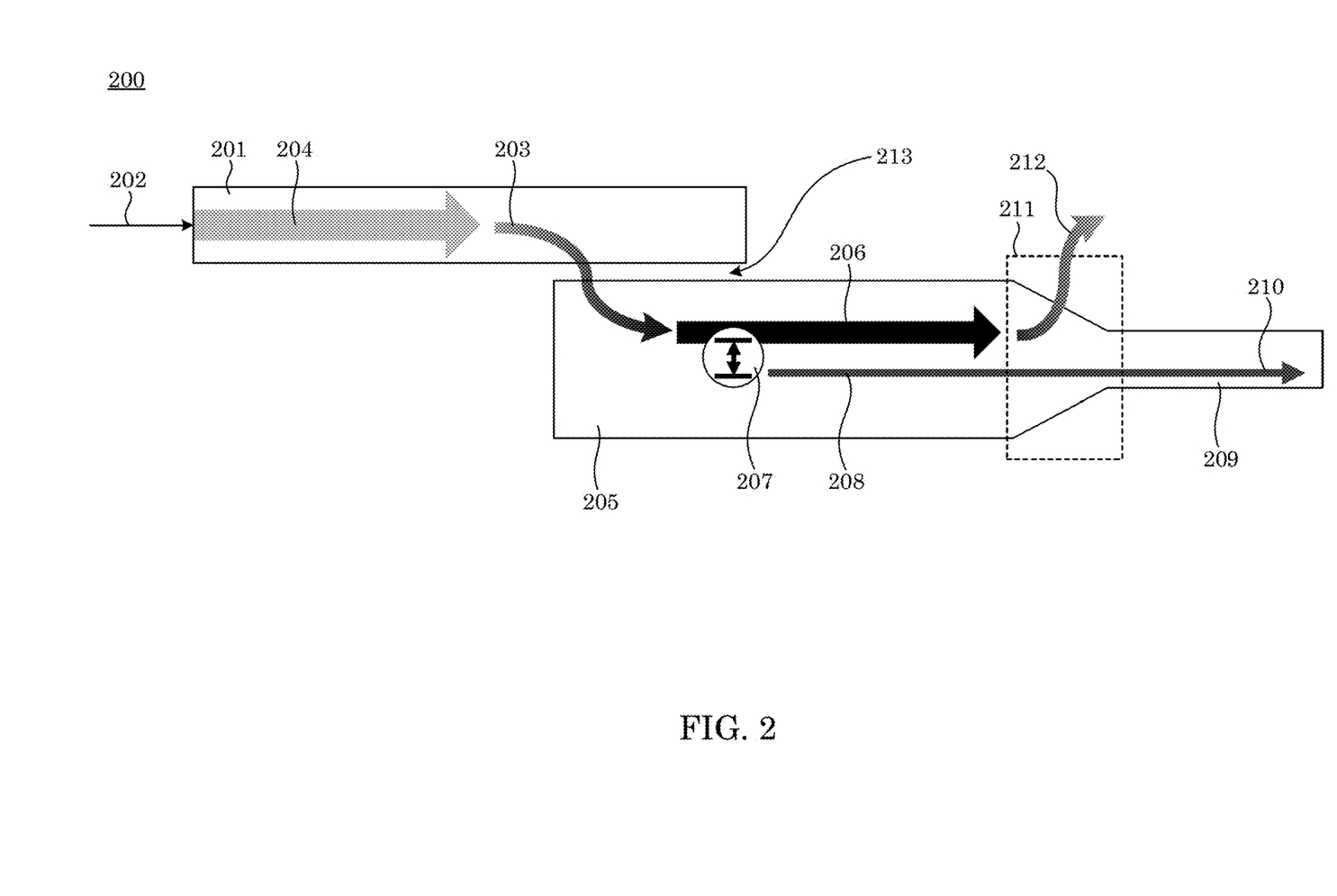
FIG. 2 shows a single quantum emitter single photon source.

In an embodiment, with reference to FIG. 2, single quantum emitter single photon source 200 includes: single-mode excitation waveguide 201 that receives pump light 202, propagates pump light 202 as resonant excitation light 204, and produces evanescent excitation light 203 from resonant excitation light 204; separation gap 213 that separates single-mode excitation waveguide 201 and multi-mode intermediate waveguide 205 and that receives evanescent excitation light 203 from single-mode excitation waveguide 201; multi-mode intermediate waveguide 205 in evanescent communication with single-mode excitation waveguide 201 and that: includes single quantum emitter 207 disposed in multi-mode intermediate waveguide 205, evanescently receives evanescent excitation light 203 from single-mode excitation waveguide 201 across separation gap 213, propagates evanescent excitation light 203 as resonant excitation light 206, and subjects single quantum emitter 207 to resonant excitation light 206 such that single quantum emitter 207 produces emitted single photons 208 from resonant excitation light 206; adiabatic mode transformer 211 that separates multi-mode intermediate waveguide 205 and single-mode output waveguide 209 and that: is in optical communication with multi-mode intermediate waveguide 205, receives emitted single photons 208 from multi-mode intermediate waveguide 205, rejects resonant excitation light, and optically couples multi-mode intermediate waveguide 205 and single-mode output waveguide 209; and single-mode output waveguide 209 in optical communication with adiabatic mode transformer 211 and that: receives emitted single photons 208 from adiabatic mode transformer 211, and propagates emitted single photons 208 as emitted single photon stream 210.

According to an embodiment, single quantum emitter single photon source 200 further includes a substrate on which single-mode excitation waveguide 201, multi-mode intermediate waveguide 205, and single-mode output waveguide 209 are disposed. The substrate can include a material that mechanically and optically support waveguides and optical communication. Exemplary substrates include glass, ceramic, plastic, metal, silicon dioxide, and the like.

A laser can be disposed on the substrate in optical communication with single-mode excitation waveguide 201 to provide pump light 202 to single-mode excitation waveguide 201. Exemplary lasers include semiconductor diode lasers, titanium-sapphire lasers, and the like. A wavelength of pump light 202 can be from 300 nm to 2000 nm, specifically from 700 nm to 1000 nm, and more specifically from 900 nm to 950 nm. It is contemplated that the wavelength of pump light 202 coincides with an emission wavelength of single quantum emitter 207, i.e., the wavelength of pump light 202 can be the same as the emission wavelength of single quantum emitter 207, e.g., from 400 nm to 1000 nm.

In an embodiment, single quantum emitter 207 includes a fluorescent molecule, a quantum dot, a color center, or a combination comprising at least one of the foregoing single quantum emitters. Exemplary fluorescent molecules include terrylene, dibenzoterrylene, and the like. Exemplary quantum dots include InAs, GaAs CdTe, and the like. Exemplary color centers include nitrogen-vacancies in a diamond, a vacancy in SiC, and the like. A wavelength of emitted single photons 208 can be from 300 nm to 2000 nm, specifically from 700 nm to 1000 nm, and more specifically from 900 nm to 950 nm.

In an embodiment, adiabatic mode transformer 211 filters free-space propagation light 212 by evanescently coupling resonant excitation high-order mode light 206 out of multimode intermediate waveguide 205 while communicating emitted single photons 208 from multi-mode intermediate waveguide 205 to single-mode output waveguide 209 through adiabatic mode transformer 211. For this purpose, adiabatic mode transformer 211 converts first order mode light from multimode intermediate waveguide 205 to single-mode output waveguide 209. Adiabatic mode transformer 211 can include a waveguide with a longitudinally-varying profile that transitions from a multi-mode regime to a single-mode regime. At a specific point along a length of adiabatic mode transformer 211, adiabatic mode transformer 211 ceases to support high-order waveguide-bound modes so that pump laser power in resonant excitation light 206 propagated by multi-mode intermediate waveguide 205 is launched into free-space. Adiabatic mode transformer 211 adiabatically converts single photons initially carried by the fundamental mode of multi-mode intermediate waveguide 205 to the fundamental mode of single-mode output waveguide 209. Adiabatic mode transformer 211 provides spatial mode filtering of photons and selectively communicates emitted single photons 208 to single-mode output waveguide 209.

Waveguides (201, 205, 211, 209) independently can include a core and a cladding to transversely confine and guide light over a length of more than one. Exemplary waveguides include GaAs suspended channel waveguides, InGaAsP ridge-loaded waveguides, and silicon-on-insulator ridge waveguides. A transmittivity of waveguides (201, 205, 211, 209) independently can be from 0 to 100% at a wavelength from 300 nm to 2000 nm.

Single quantum emitter single photon source 200 can be made in various ways. In an embodiment, a process for making single quantum emitter single photon source 200 includes forming single-mode excitation waveguide 201 on a substrate; forming multi-mode intermediate waveguide 205 on the substrate proximate to and in evanescent communication with single-mode excitation waveguide 201; disposing single quantum emitter 207 in multi-mode intermediate waveguide 205 by drop-casting; forming single-mode output waveguide 209 on the substrate proximate to and in communication with multi-mode intermediate waveguide 205. In some embodiments, the process includes forming single-mode output waveguide 209 in evanescent communication with multi-mode intermediate waveguide 205. In some embodiments, the process includes forming adiabatic mode transformer 211 in optical communication with multi-mode intermediate waveguide 205 and single-mode output waveguide 209 so that adiabatic mode transformer 211 is optically interposed between multi-mode intermediate waveguide 205 and adiabatic mode transformer 211. It is contemplated that forming waveguides on substrate can include microfabrication or nanofabrication processing that include deposition, lithography, etching, and the like.

Single-mode excitation waveguide 201 and multi-mode intermediate waveguide 205 are formed on the substrate so that a length of single-mode excitation waveguide 201 and multi-mode intermediate waveguide 205 overlap for evanescent coupling between single-mode excitation waveguide 201 and multi-mode intermediate waveguide 205. It is contemplated that a length of overlap between single-mode excitation waveguide 201 and multi-mode intermediate waveguide 205 can be from 1 µm to 1000 µm, specifically from 10 µm to 100 µm, and more specifically from 15 µm to 20 µm. The length of overlap can be from 0.5 to 1000 wavelengths, specifically 1 wavelength to 100 wavelengths, 5 wavelengths to 10 wavelengths.

In some embodiments, multi-mode intermediate waveguide 205 and single-mode output waveguide 209 are formed on the substrate so that a length of multi-mode intermediate waveguide 205 and single-mode output waveguide 209 overlap for evanescent coupling between multi-mode intermediate waveguide 205 and single-mode output waveguide 209. It is contemplated that a length of overlap between multi-mode intermediate waveguide 205 and single-mode output waveguide 209 can be from 1 µm to 1000 µm, specifically from 10 µm to 100 µm, and more specifically from 15 µm to 20 µm.

In some embodiments, multi-mode intermediate waveguide 205 and single-mode output waveguide 209 are formed on the substrate so that adiabatic mode transformer 211 optically couples multi-mode intermediate waveguide 205 and single-mode output waveguide 209. It is contemplated that a length of adiabatic mode transformer 211 through which emitted single photons 208 propagates can be from 0 to 1000 µm, specifically from 1 µm to 100 µm, and more specifically from to 2 µm to 10 µm. A width of adiabatic mode transformer 211 parallel to the substrate and substantially orthogonal to a direction of propagation of emitted single photons 208 through adiabatic mode transformer 211 can be from 0.3 µm to 100 µm, specifically from 0.5 µm to 10 µm, and more specifically from 1 µm to 2 µm.

The process for making single quantum emitter single photon source 200 also can include epitaxial growth of quantum emitters, quantum emitter localization, and the like.

In an embodiment, a process for operating single quantum emitter single photon source 200 includes injecting pump laser light 202 into single-mode excitation waveguide 201 at a wavelength closely resonant with that of quantum emitter 207; controlling excitation laser power so that it is less than 10% of the power to saturate single-photon emission from quantum emitter 207; tuning the laser wavelength slowly towards that of quantum emitter 207; observing an increase of flux of emitted single-photon stream 210 at output waveguide 209; and optionally observing, e.g., with a single-photon detector or single-photon-sensitivity spectrometer, emitted single-photon stream 210 at output waveguide 209.

Single quantum emitter single photon source 200 has numerous advantageous and unexpected benefits and uses. In an embodiment, a process for producing a single photon stream with single quantum emitter single photon source 200 includes: producing pump light 202; receiving, by single-mode excitation waveguide 201, pump light 202; propagating pump light 202 as resonant excitation light 204 in single-mode excitation waveguide 201; producing evanescent excitation light 203 from resonant excitation light 204; receiving evanescent excitation light 203 in separation gap 213 that separates single-mode excitation waveguide 201 from multi-mode intermediate waveguide 205; propagating evanescent excitation light 203 through separation gap 213; evanescently receiving, by multi-mode intermediate waveguide 205, evanescent excitation light 203 from single-mode excitation waveguide 201 through separation gap 213; propagating evanescent excitation light 203 as resonant excitation light 206 through multi-mode intermediate waveguide 205; subjecting single quantum emitter 207 disposed in multi-mode intermediate waveguide 205 to resonant excitation light 206; producing, by single quantum emitter 207, emitted single photons 208 from resonant excitation light 206; propagating emitted single photons 208 through multi-mode intermediate waveguide 205; communicating emitted single photons 208 from multi-mode intermediate waveguide 205 to single-mode output waveguide 209; receiving, by single-mode output waveguide 209, emitted single photons 208 from multi-mode intermediate waveguide 205; and propagating, through single-mode output waveguide 209, emitted single photons 208 at emitted single photon stream 210 to produce emitted single photon stream 210.

Figure 1:
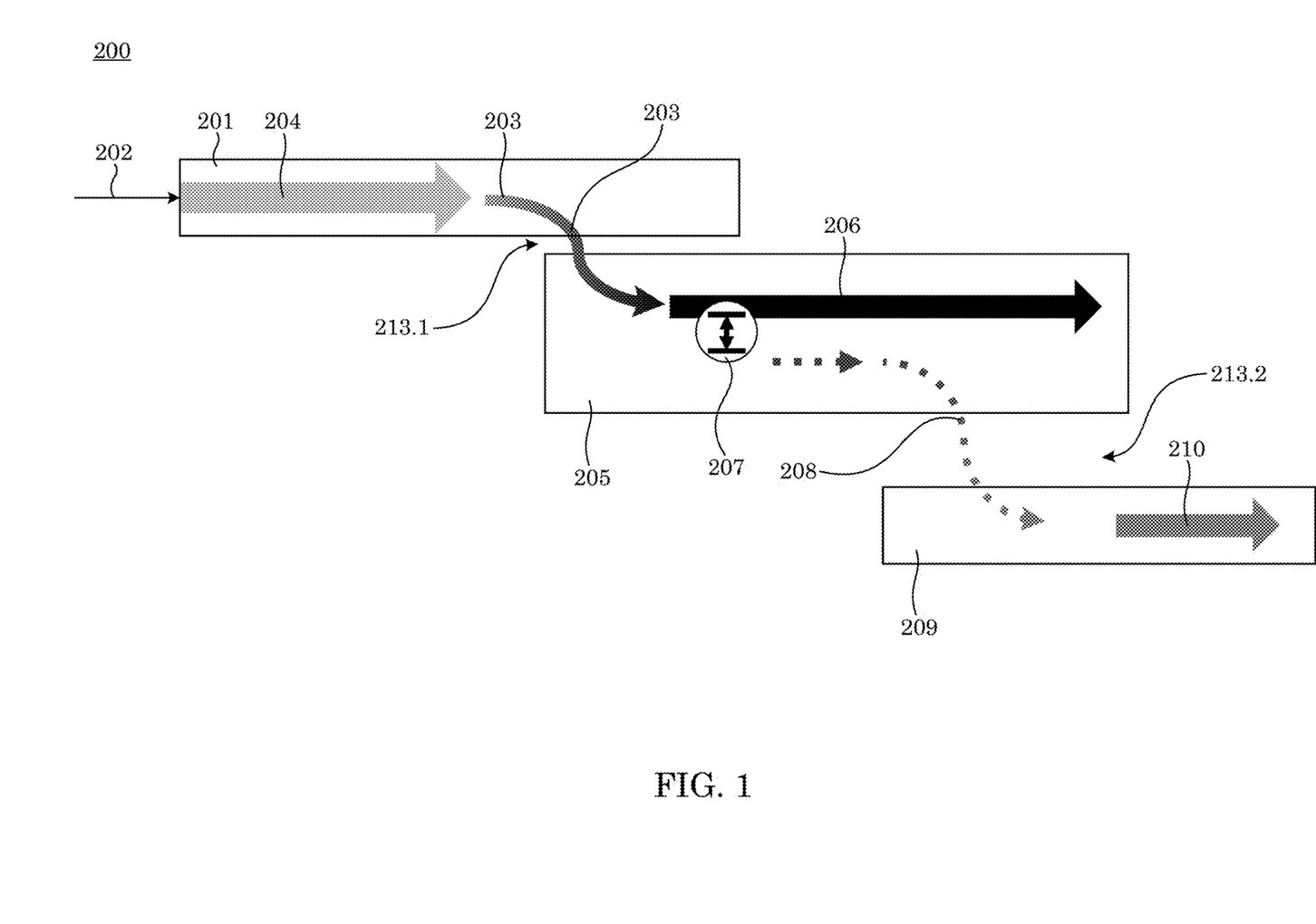
FIG. 1 shows a single quantum emitter single photon source.

In an embodiment, the process for producing a single photon stream with single quantum emitter single photon source 200 also includes receiving the emitted single photons 208 in second separation gap 213.2 that separates multi-mode intermediate waveguide 205 from single-mode output waveguide 209; propagating emitted single photons 208 through second separation gap 213.2; and evanescently receiving, by single-mode output waveguide 209, emitted single photons 208 from multi-mode intermediate waveguide 205 through second separation gap 213.2.

In an embodiment, the process for producing a single photon stream with single quantum emitter single photon source 200 also includes receiving emitted single photons 208 in adiabatic mode transformer 211 that separates multi-mode intermediate waveguide 205 from single-mode output waveguide 209; propagating emitted single photons 208 through adiabatic mode transformer 211; and evanescently receiving, by single-mode output waveguide 209, emitted single photons 208 from multi-mode intermediate waveguide 205 through adiabatic mode transformer 211.

It should be appreciated that single quantum emitter single photon source 200 provides an integrated photonic device that produces a pure stream of on-chip waveguide-bound indistinguishable single-photons as emitted single photon stream 210 from resonance fluorescence of single quantum emitter 207 disposed in multi-mode intermediate waveguide 205 that is an on-chip waveguide. Here, single quantum emitter 207 is excited by on-chip waveguide-bound resonant laser light as evanescent excitation light 203 from resonant excitation light 204.

Single quantum emitter single photon source 200, rather than performing excitation of single quantum emitter 207 via a free-space resonant laser beam, single quantum emitter 207 is excited through a high-order guided wave mode as resonant excitation light 206, which is injected into multi-mode intermediate waveguide 205 in which is disposed single quantum emitter 207 by single-mode excitation waveguide 201 evanescently-coupled to multi-mode intermediate waveguide 205. Emitted single photons 208 are extracted from multi-mode intermediate waveguide 205 into single-mode output waveguide 209 evanescently coupled to multi-mode intermediate waveguide 205. Single quantum emitter 207 produces a single photon that is coupled with high probability to the first-order mode of multi-mode intermediate waveguide 205 and with very low probability to higher-order modes of multi-mode intermediate waveguide 205. Emitted single photons 208 is then transferred to single-mode output waveguide 209.

Figure 3:
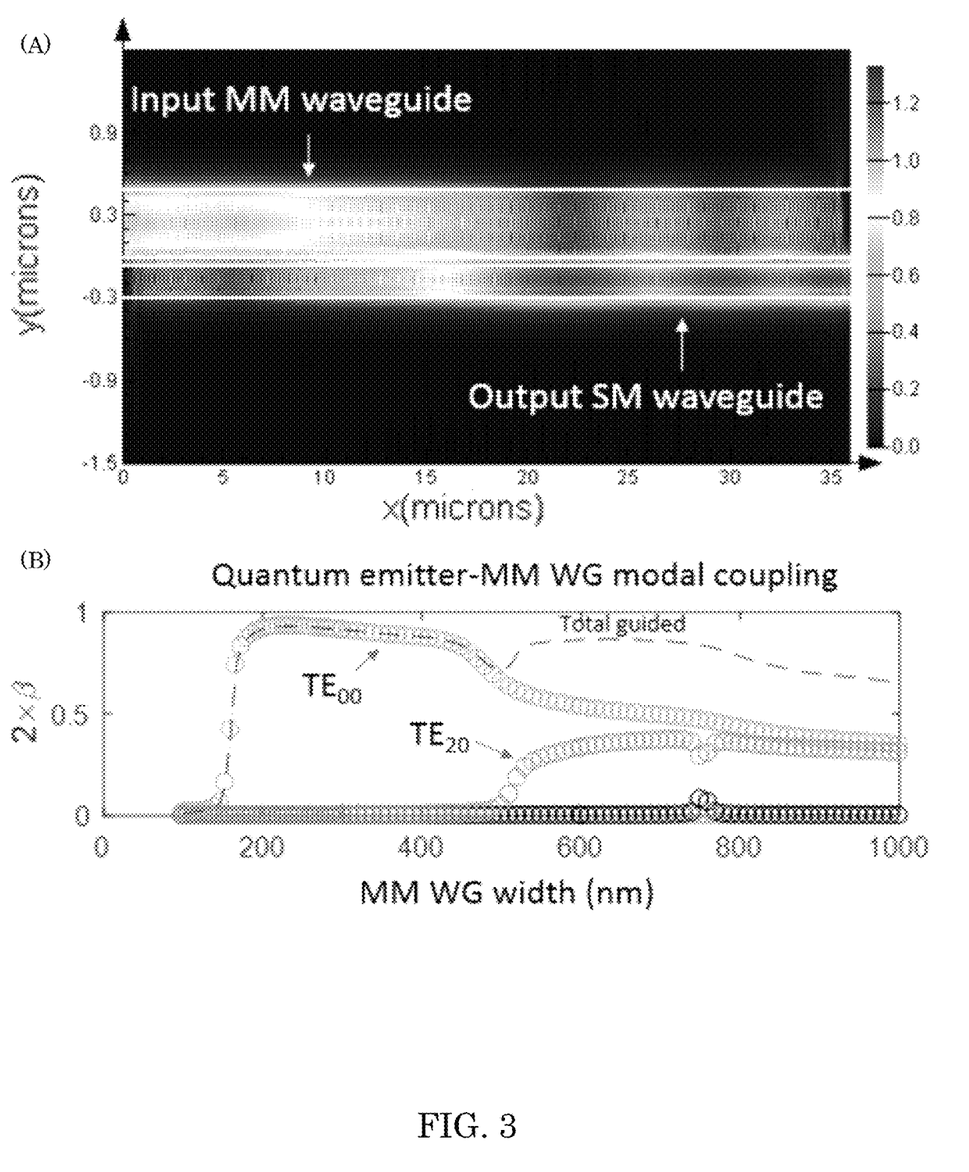
FIG. 3 shows values determined by FDTD for modal coupling factor $\beta$ between a single emitter located at the center of a multi-mode intermediate waveguide and guided modes thereof, labeled $TE_{00}$ and $TE_{20}$, as a function of a width of the multi-mode intermediate waveguide.

With regard to transfer of photons among waveguides in single quantum emitter single photon source 200, FIG. 3A shows an electromagnetic finite-difference time-domain simulation of evanescently coupled multi-mode intermediate waveguide 205 and single-mode output waveguide 209. The scale indicates light intensity. Light is initially carried by a high-order $TE_{20}$ mode of multi-mode intermediate waveguide 205 from position x=0. The waveguides (205, 209) are phase matched so that efficient (e.g., 91% efficient) power transfer via propagation of emitted single photons 208 occurs from the $TE_{20}$ waveguide mode of multi-mode intermediate waveguide 205 to the single $TE_{00}$ mode of single-mode output waveguide 209 at x=35 µm. A reverse propagation is also valid, wherein light initially carried in single-mode output waveguide 209 by $TE_{00}$ mode is transferred with 91% efficiency into $TE_{20}$ mode of multi-mode intermediate waveguide 205. Single quantum emitter single photon source 200 provides insertion of resonant excitation light 204 into single-mode excitation waveguide 201 and extraction of emitted single photons 208 from multi-mode intermediate waveguide 205 as shown in FIG. 1. A power transfer efficiency between waveguides can be controlled though dimensions of single-mode output waveguide 209 and spatial separation between multi-mode intermediate waveguide 205 and single-mode output waveguide 209.

FIG. 3B shows values calculated with finite-difference time-domain (FDTD) for modal coupling factor β between single quantum emitter 207 disposed at a center of multi-mode intermediate waveguide 205 and guided modes of multi-mode intermediate waveguide 205 that is labeled as $TE_{00}$ and $TE_{20}$ as a function of width of multi-mode intermediate waveguide 205. Modal coupling factor β indicates efficiency with which single quantum emitter 207 is brought into an excited state by resonant excitation light 206 carried by different modes supported by multi-mode intermediate waveguide 205 and also indicates a probability with which emitted single photons 208 couple to different modes of multi-mode intermediate waveguide 205. Accordingly, the optical power to excite single quantum emitter 207 into the excited state can be minimized by modifying modal coupling factor β via the width of multi-mode intermediate waveguide 205.

Single quantum emitter single photon source 200 and processes disclosed herein have numerous beneficial uses, including simple operation for resonant excitation, independence from free-space optical pumping, independence from free-space optics pump suppression apparatus, and production of waveguided single-photon stream. Advantageously, single quantum emitter single photon source 200 overcomes limitations of technical deficiencies of conventional compositions such as technically demanding operation, free-space outcoupling of single-photon stream, pump suppression dependent on quality of free-space optical pumping and free-space optical pump suppression apparatus. Further, optimization of pump suppression relies on guided-wave optics and geometrical feature control, which is simpler to rationalize than free-space optical schemes.

Beneficially, single quantum emitter single photon source 200 can include single InAs quantum dots that produce single-photon streams on-demand into on-chip silicon nitride waveguides, wherein the single quantum emitters are optically excited with pulsed laser light and produce single photons at each pulse, on-demand. Moreover, single quantum emitter single photon source 200 produces streams of highly indistinguishable single photons from excitation with laser light that is at the same wavelength as the emitted single photons. Single quantum emitter single photon source 200 overcomes technical issues with conventional articles that introduce excitation laser light into a waveguide where the single-photons are launched such as quantum emitter excitation through a free-space beam that is orthogonal to a waveguide into which the single-photons are launched. Such orthogonal excitation can have significant leakage into the waveguide. In contrast, single quantum emitter single photon source 200 overcomes leakage problems from free-space excitation laser.

Single quantum emitter single photon source 200 and processes herein unexpectedly provide excitation of quantum emitter 207 by resonant excitation light 206 that is evanescently injected into multimode intermediate waveguide 205; and provides extraction of single-photon stream 208 into output waveguide 209, either evanescently through separation gap 213, or through adiabatic mode transformer 211, while preventing excitation pump light 206 from being injected into output waveguide 209. Moreover, single quantum emitter single photon source 200 provides a single photon stream directly in an on-chip waveguide.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A single quantum emitter single photon source for producing a single photon stream, the single quantum emitter single photon source comprising:
    a single-mode excitation waveguide that receives a pump light, propagates pump light as resonant excitation light, and produces evanescent excitation light from resonant excitation light;
    a first separation gap that separates the single-mode excitation waveguide and a multi-mode intermediate waveguide and that receives the evanescent excitation light from the single-mode excitation waveguide;
    the multi-mode intermediate waveguide in evanescent communication with the single-mode excitation waveguide and that:
        comprises a single quantum emitter disposed in the multi-mode intermediate waveguide,
        evanescently receives the evanescent excitation light from the single-mode excitation waveguide across the first separation gap,
        propagates the evanescent excitation light as resonant excitation light, and
        subjects the single quantum emitter to the resonant excitation light such that the single quantum emitter produces emitted single photons from the resonant excitation light;
    a second separation gap that separates the multi-mode intermediate waveguide and a single-mode output waveguide and that receives the emitted single photons from the multi-mode intermediate waveguide; and
    the single-mode output waveguide in evanescent communication with the multi-mode intermediate waveguide and that:
        evanescently receives the emitted single photons from the multi-mode intermediate waveguide across the second separation gap, and
        propagates the emitted single photons as emitted single photon stream.

2. The single quantum emitter single photon source of claim 1, further comprising a substrate on which the single-mode excitation waveguide, the multi-mode intermediate waveguide, and the single-mode output waveguide are disposed.

3. The single quantum emitter single photon source of claim 2, further comprising a laser disposed on the substrate in optical communication with the single-mode excitation waveguide and that provides the pump light to the single-mode excitation waveguide.

4. The single quantum emitter single photon source of claim 1, wherein the single quantum emitter comprises a fluorescent molecule, a quantum dot, a sub-wavelength scattering center, or a combination comprising at least one of the foregoing single quantum emitters.

5. The single quantum emitter single photon source of claim 1, wherein a wavelength of the pump light is the same as photon emitted from the quantum emitter.

6. The single quantum emitter single photon source of claim 1, wherein a wavelength of the emitted single photons is from 900 nm to 1000 nm.

7. A single quantum emitter single photon source for producing a single photon stream, the single quantum emitter single photon source comprising:
    a single-mode excitation waveguide that receives a pump light, propagates pump light as resonant excitation light, and produces evanescent excitation light from resonant excitation light;
    a separation gap that separates the single-mode excitation waveguide and a multi-mode intermediate waveguide and that receives the evanescent excitation light from the single-mode excitation waveguide;
    the multi-mode intermediate waveguide in evanescent communication with the single-mode excitation waveguide and that:
        comprises a single quantum emitter disposed in the multi-mode intermediate waveguide,
        evanescently receives the evanescent excitation light from the single-mode excitation waveguide across the separation gap,
        propagates the evanescent excitation light as resonant excitation light, and
        subjects the single quantum emitter to the resonant excitation light such that the single quantum emitter produces emitted single photons from the resonant excitation light;
    an adiabatic mode transformer that separates the multi-mode intermediate waveguide and a single-mode output waveguide and that:
        is in optical communication with the multi-mode intermediate waveguide,
        receives the emitted single photons from the multi-mode intermediate waveguide, and
        optically couples the multi-mode intermediate waveguide and the single-mode output waveguide; and the single-mode output waveguide in optical communication with the adiabatic mode transformer and that:
　　receives the emitted single photons from the adiabatic mode transformer, and
　　propagates the emitted single photons as emitted single photon stream.

8. The single quantum emitter single photon source of claim 7, further comprising a substrate on which the single-mode excitation waveguide, the multi-mode intermediate waveguide, and the single-mode output waveguide are disposed.

9. The single quantum emitter single photon source of claim 8, further comprising a laser disposed on the substrate in optical communication with the single-mode excitation waveguide and that provides the pump light to the single-mode excitation waveguide.

10. The single quantum emitter single photon source of claim 7, wherein the single quantum emitter comprises a fluorescent molecule, a quantum dot, a sub-wavelength scattering center, or a combination comprising at least one of the foregoing single quantum emitters.

11. The single quantum emitter single photon source of claim 7, wherein a wavelength of the pump light is the same as that emitted from the quantum emitter.

12. The single quantum emitter single photon source of claim 7, wherein a wavelength of the emitted single photons is from 900 nm to 1000 nm.

13. A process for producing a single photon stream with a single quantum emitter single photon source, the process comprising:
　　producing a pump light;
　　receiving, by a single-mode excitation waveguide, the pump light;
　　propagating the pump light as resonant excitation light in the single-mode excitation waveguide;
　　producing evanescent excitation light from the resonant excitation light;
　　receiving the evanescent excitation light in a separation gap that separates the single-mode excitation waveguide from a multi-mode intermediate waveguide;
　　propagating the evanescent excitation light through the separation gap;
　　evanescently receiving, by the multi-mode intermediate waveguide, the evanescent excitation light from the single-mode excitation waveguide through the separation gap;
　　propagating the evanescent excitation light as resonant excitation light through the multi-mode intermediate waveguide;
　　subjecting a single quantum emitter disposed in the multi-mode intermediate waveguide to the resonant excitation light;
　　producing, by the single quantum emitter, emitted single photons from the resonant excitation light;
　　propagating the emitted single photons through the multi-mode intermediate waveguide;
　　communicating the emitted single photons from the multi-mode intermediate waveguide to a single-mode output waveguide;
　　receiving, by the single-mode output waveguide, the emitted single photons from the multi-mode intermediate waveguide; and
　　propagating, through the single-mode output waveguide, the emitted single photons at emitted single photon stream to produce the emitted single photon stream.

14. The process of claim 13, further comprising:
　　receiving the emitted single photons in a second separation gap that separates the multi-mode intermediate waveguide from the single-mode output waveguide;
　　propagating the emitted single photons through the second separation gap; and
　　evanescently receiving, by the single-mode output waveguide, the emitted single photons from the multi-mode intermediate waveguide through the second separation gap.

15. The process of claim 13, further comprising:
　　receiving the emitted single photons in an adiabatic mode transformer that separates the multi-mode intermediate waveguide from the single-mode output waveguide;
　　propagating the emitted single photons through the adiabatic mode transformer; and
　　evanescently receiving, by the single-mode output waveguide, the emitted single photons from the multi-mode intermediate waveguide through the adiabatic mode transformer.

16. The process of claim 13, wherein the single quantum emitter comprises a fluorescent molecule, a quantum dot, a sub-wavelength scattering center, or a combination comprising at least one of the foregoing single quantum emitters.

17. The process of claim 13, wherein a wavelength of the pump light is the same as that emitted from the quantum emitter.

18. The process of claim 13, wherein a wavelength of the emitted single photons is from 900 nm to 1000 nm.

* * * * *